(12) United States Patent         (10) Patent No.:     US 8,424,884 B1
Nicol                             (45) Date of Patent:     Apr. 23, 2013

(54) PANEL TRANSPORT, LIFT AND POSITIONING DEVICE

(76) Inventor: Thomas Clark Nicol, Casper, WY (US)

( * ) Notice: Subject to any disclaimer, the term of this patent is extended or adjusted under 35 U.S.C. 154(b) by 268 days.

(21) Appl. No.: 13/032,330

(22) Filed: Feb. 22, 2011

Related U.S. Application Data

(60) Provisional application No. 61/341,312, filed on Mar. 29, 2010.

(51) Int. Cl.
    *B62B 1/12* (2006.01)
(52) U.S. Cl.
    USPC .................. 280/47.29; 280/47.28; 414/11
(58) Field of Classification Search ............ 280/47.27, 280/47.28, 47.29, 79.7; 414/10, 11, 490, 414/491, 494, 628, 629, 639, 743
    See application file for complete search history.

(56) References Cited

U.S. PATENT DOCUMENTS

| | | | |
|---|---|---|---|
| 3,305,219 A | 2/1967 | Rhodes | |
| 5,251,922 A * | 10/1993 | Mann | 280/47.29 |
| 5,303,899 A | 4/1994 | Palya | |
| 5,460,469 A * | 10/1995 | Young | 414/11 |
| 5,584,635 A | 12/1996 | Stapelmann | |
| 6,241,447 B1 | 6/2001 | Echternacht | |
| 6,739,819 B2 * | 5/2004 | Caudill et al. | 414/11 |
| 6,857,836 B2 * | 2/2005 | Keller | 414/11 |
| 6,921,095 B2 * | 7/2005 | Middleby | 280/47.29 |
| 7,219,903 B2 * | 5/2007 | Grooters et al. | 280/47.27 |
| 7,448,598 B1 * | 11/2008 | Elmlinger et al. | 254/338 |

OTHER PUBLICATIONS

Models 755011 and 755010, available from Refina Ltd., Unit 7, Upton Industrial Estate, Factory Road, Poole, Dorset, BH16 5SL, UK.
Panellift® 439 available from Telpro Inc., 7251 South 42nd Street, Grand Forks, ND 58201.

* cited by examiner

*Primary Examiner* — John Walters
(74) *Attorney, Agent, or Firm* — Richard L. Marsh

(57) ABSTRACT

A device for transporting, lifting and positioning a panel upon a wall comprises a main frame and a movable carriage which slides up and down the main frame. The carriage is pulled along the main frame by a cable which runs from the bottom of the movable carriage through a pulley at the top of the main frame and to a winch mounted to the main frame. A construction panel is placed on a frontal lip of the movable carriage at a floor level. The construction panel is then moved to a desired location by tilting the main frame onto wheels supported on an axle framework at the bottom of the main frame. The main frame may then be tilted toward a vertical surface lifting the wheels free of the ground and the device rested on rollers supported on spindles affixed to the lower cross members of the mainframe. The panel may then be moved laterally along the vertical surface and/or lifted into an elevated position while the device remains biased against the vertical surface as the center of gravity of the device shifts forward of the rollers when leaned against the vertical surface.

10 Claims, 3 Drawing Sheets

PANEL TRANSPORT, LIFT AND POSITIONING DEVICE

CROSS REFERENCE TO RELATED APPLICATIONS

This application is a non-provisional application of Applicant's provisional application Ser. No. 61/341,312 filed on 29 Mar. 2010, incorporated herein by this reference thereto.

BACKGROUND OF THE INVENTION

1. Field of the Invention

This invention relates to a device for transporting sheet materials, lifting same into position and positioning same to a desired location. The device is adapted to lean against a vertical surface and balanced to retain the sheet material against the vertical surface.

2. Prior Art Statement

It is known to provide a tripod base on casters which can pick up a panel from a location near a surface, transport the panel to a place of installation, lift the panel into place up to 4 meters with an additional extension, rotate the panel for positioning and shift the entire apparatus for placement. The board handling frame has a lip on one end and a pair of lift tabs on one edge. For instance, see models 755011 and 755010 available from Refina Ltd., Unit 7, Upton Industrial Estate, Factory Road, Poole, Dorset, BH16 5SL, UK. This device cannot transport a panel through an interior household rough-in door opening as the tripod legs of the device are spaced at least one meter apart and the device must be disassembled for transport. The lower cost model of the device is offered at £599, that is, between $900 and $1000 USD and therefore is quite expensive. The wheels of the device must be locked in position in order to retain the panel in an installation position. No means for guiding the panel in a defined path is provided. Therefore, there exists a great need for a panel transport, lift and positioning device comprising a lift carriage on a two-wheeled transport dolly that can transport a panel laterally through an interior household rough-in door opening, lift and/or position the panel against a vertical surface and retain the panel against the surface without secondary retaining operations. There is a need for a device which expertly guides the panel upwardly along a frame work. Additionally, a lower cost transport, lift and positioning device is needed for independent contractors and individual builders.

It is also known to provide an optional floor loader attachment with a separate winch that allows lifting a panel from four inches above a floor level up to the hooks on the drywall lift device wherein the drywall lift device is mounted to a tripod base. For instance, see Panellift® 439 available from Telpro Inc., 7251 South 42nd Street, Grand Forks, N. Dak. 58201. Though quite robust, this device also cannot transport a panel through an interior household rough-in door opening and is more expensive. With the optional device, the entire panel must be lifted free of the floor up to the four inch level. No means is provided to direct the lifting of the panel along a straight path. Therefore, there is a great need for a panel transport, lift and positioning device comprising a two-wheeled transport dolly with a lift carriage that can transport a panel laterally through an interior household rough-in door opening, lift and/or position the panel against a vertical surface and retain the panel against the surface without secondary retaining operations while allowing loading of the panel at the floor level by lifting one end of the panel to engage the lip of the lift carriage. There is a need for a device which guides the panel upwardly in a straight path along a frame work of the device. There is also still a need for a lower cost panel transport, lift and positioning device.

It is further known to provide a frame that carries a movable intermediate frame which in turn has a loading frame movably attached thereto. A cable winch lifts both frames to a desired height allowing for installation of panels on a vertical surface, a horizontal surface or at any angle therebetween. As the device is relatively narrow and is mounted on caster wheels, movement of the device with its load through a doorway is possible though clearance for rotating the board through the door opening is required. For instance, see the U.S. Pat. No. 3,305,219 issued on Feb. 21, 1967 to Frank Rhodes. The device lifts a panel from a floor level but must be raised in position above the transport wheels and locked in position prior to transport. Though the device is useful in raising panels along a vertical surface for placement thereupon, the multiple locking and unlocking operations require additional time and effort therefore increasing the time required for mounting a panel. Therefore there is a need for a simply constructed, low cost panel transport, lift and positioning device that can have a panel placed on a carrying lip at a floor level, transport the entire device with panel laterally through door, manually lean the panel against a vertical surface, raise and or move the panel into position. As the panel transport, lift and positioning device has a center of gravity forward of surface engaging rollers, the panel transport, lift and positioning device of this invention retains the panel against the vertical surface as the panel transport, lift and positioning device is biased toward the vertical surface.

A known panel lift device comprises a pair of rectangular posts joined together with upper and lower cross bars. The upper cross bar is mounted to extensible legs slidably mounted in the rectangular posts and has a centrally mounted pulley. A pair of small rollers are provided adjacent the bottom end of the rectangular posts. A panel lifter plate is slidably engaged with an outer surface of the rectangular posts and has an eye attached for a cable from a winch. A winch is mounted on a third leg disposed between the rectangular posts, the third leg angularly mounted to a midpoint cross bar. The winch operates to lift the lifter plate. Each of the legs is further provided with an extensible foot to level the device on a support surface. The device is adapted to move a panel from a storage location to a wall, lift the panel to the desired height and mount the panel to the wall, however the device cannot move the panel laterally along the wall. Additionally, there is no means to guide the panel in a straight path while elevating the panel above the support surface. For instance, see the U.S. Pat. No. 5,303,899 issued on Apr. 19, 1994 to Jerome C. Palya. The inventor hereof has found that the small rollers used for transporting the panel of the cited patent are unsuitable for movement on most support surfaces and therefore there is a need for a panel transport, lift and positioning device comprising a lift carriage on a two-wheeled transport dolly wherein the transport wheels are substantial in diameter. There is also a need for a device which easily and expertly guides the panel upwardly along a frame work of the transport, lift and positioning device. The need for a panel transport, lift and positioning device that is relatively low in cost and is provided with rollers for moving a panel laterally along a vertical surface is great.

Another known device, shown and described in U.S. Pat. No. 5,584,635 issued on Dec. 17, 1996 to Frank Stapelmann, comprises a tiltable frame for transporting, fitting and installing panels that is carried on a castered base. The frame has a plurality of roller balls positioned below the panel that can be mechanically lowered into contact with the support surface wherein a front set of casters is lifted free of the floor and wherein the frame and panel may be moved laterally on the balls and the rear set of casters. The panel is strapped to the framework. The panel may only be lifted a short distance by mechanically lowering the roller balls onto the surface as no other lifting mechanism is provided. The plate carrying the roller balls is adjustable at both ends for leveling the panel. Though the device and panel may be moved laterally, it has been found that it is difficult to initially move the panel directly laterally as the rear casters must first pivot on a vertical axis thus causing the device and panel to yaw at initial movement. Additionally, since there is no additional lifting provided, placement of construction panels above a floor level is not possible so there is still a need for a device which may easily and expertly guide a panel upwardly along a frame work of the transport, lift and positioning device to a greatly elevated position. Thus, the great need for a simply constructed panel transport, lift and positioning device comprising a two-wheeled transport dolly with a lift carriage still exists.

Finally, it is known to provide a base with four larger diameter wheels wherein the base supports a laterally movable and forwardly tiltable frame. The frame has a lower lip for receiving the bottom edge of a door to be carried and a strap at its upper end for fixing the door to the tiltable frame. The movable frame carrying the panel may be shifted laterally relative to the base as the movable frame is mounted on a plurality of rollers. A lever, disposed between side edge members of the movable frame, is pivotally mounted on the base to laterally move the tiltable frame on the rollers. A minor vertical adjustment is provided on each side edge of the tiltable frame wherein a screw thread actuated by a hand crank is used to lower a roller against the support surface to raise the associated side edge of the tiltable frame. For instance, see the U.S. Pat. No. 6,241,447 B1 issued on Jun. 5, 2001 to James E. Echternacht. The rollers associated with the side edges of the tiltable frame are on axles parallel to the axle of the larger transport wheels and thus may not be used to move the door laterally. Additionally, lateral movement is limited as the rollers of the movable frame are limited to the width of an upper sill of the frame as well as the distance of throw of the lever between the side edges. Finally, the door must be strapped to the tiltable frame for transport and positioning. Therefore, the need still exists for a panel transport, lift and positioning device comprising a lift carriage on a two-wheeled transport dolly that can transport a panel laterally through an interior household rough-in door opening, lift and/or position the panel against a vertical surface, move the panel along the vertical surface by laterally shifting the panel transport, lift and positioning device on movement rollers associated with a lower edge of the device and retain the panel against the surface without secondary retaining devices. There is also a need for a device which easily and expertly guides the panel upwardly along a frame work of the transport, lift and positioning device.

SUMMARY OF THE INVENTION

In view of the above described shortcomings of the prior art panel lifting, transporting and transporting devices, one object of this invention is to provide a device for transporting, lifting and positioning a panel upon a vertical surface such as a wall of a building that comprises a first frame, a second frame, a pair of wheels, a pair of rollers and a lifting mechanism wherein the wheels are rotatably associated with an axle affixed on a pair of "V" shaped supports adjacent a lower end of the first frame, the axle disposed parallel to the first frame. The second frame is slidably mounted upon the first frame and the rollers are rotatably mounted on a base crossbar of the first frame on separate spindles perpendicular to the first frame. The lifting mechanism is associated with the first frame and the second frame and adapted to move the second frame vertically along the first frame.

Another object of this invention is to provide a device for transporting, lifting and positioning a panel upon a vertical surface by manually leaning the panel resting freely on a lip of the lifting frame against the vertical surface wherein the device and the panel are balanced against the vertical surface thus retaining the sheet material against the vertical surface.

A primary goal of this invention is to provide a device for transporting, lifting and positioning a panel upon a vertical surface wherein the transport wheels are lifted free of the support surface upon engaging the lateral movement rollers against the support surface.

A significant feature of this invention is to provide a device for transporting, lifting and positioning a panel upon a vertical surface wherein the lateral movement rollers are lifted free of the support surface upon engaging the transport wheels against the support surface.

A main purpose of this invention is to provide a panel transport, lift and positioning device comprising a lift carriage on a two-wheeled transport dolly that can transport a panel laterally through an interior household rough-in door opening, lift and/or position the panel against a vertical surface, move the panel along the vertical surface by laterally shifting the panel transport, lift and positioning device on movement rollers associated with a lower edge of the device and retain the panel against the surface without secondary retaining devices.

A primary principle of this invention is to provide a simply constructed panel transport, lift and positioning device comprising a two-wheeled transport dolly with a lift mechanism which is economically produced.

DESCRIPTION OF THE PREFERRED EMBODIMENTS

Figure 1:
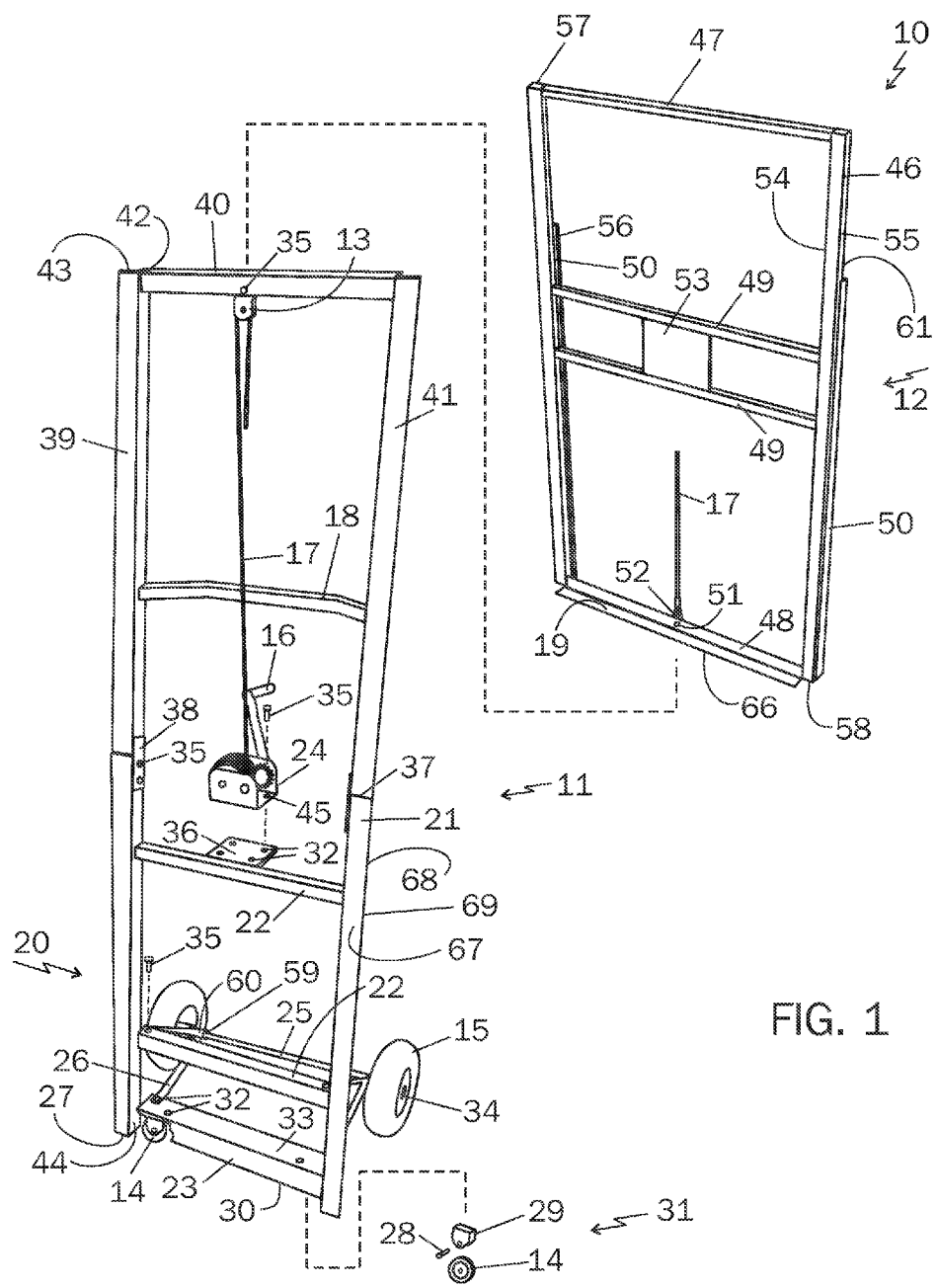
FIG. 1 is an exploded perspective view of an embodiment of the panel transport, lift and positioning device of this invention.

Referring now to FIG. 1, a device for transporting, lifting and positioning a construction panel 63 upon a vertical surface 64 is generally shown by the number 10 and comprises a main frame 11, wheels 15, rollers 14, a pulley assembly 13, a winch 24, a cable 17 and a movable carriage 12. Frame 11 further comprises a pair of spaced apart upright members 21 and at least one cross member 22, an operating handle 18 and a roller support member 23, spaced apart upright members 21 joined together by cross member 22, operating handle 18 and roller support member 23. Wheels 15 are rotatably mounted on an axle 25 supported on an axle framework 20, axle framework 20 comprising a pair of "V" shaped supports 26 affixed adjacent a lower end 27 of upright members 21 of main frame 11, rollers 14 spaced apart and rotatably mounted perpendicular to axle 25. Rollers 14 are preferably portions of roller assemblies 31 wherein rollers 14 are mounted on spindles 28 contained with a "U" shaped bracket 29, roller assemblies 31 affixed to an underside surface 30 of roller support member 23. Upright members 21 of main frame 21 are preferably 2 inch by 2 inch by ⅛ inch thick angle iron while roller support member 39 is preferably 3 inch by 3 inch by 3/16 inch angle iron and cross members 22 are a 1½ inch by 1½ inch by ⅛ inch angle iron, however, it should be fully understood that upright members 21 may alternately be round tubing, box beam or any other shape as long as upright members 21 effectively mate with side members 41 of extension frame 39. Likewise, roller support member 39 may be round tubing, box beam or any other shape though it has been found that the 3 inch angle iron provides for ready mounting of roller assemblies 31. In a similar manner, cross members 22 may be round tubing, angle iron or any other shape. "V" shaped supports 26 of axle assembly 20 are constructed of two one inch wide strap irons affixed to top plate 33 of roller support member 23 adjacent upright members 21 and two one inch wide strap irons affixed to cross member 22 spaced above roller support member 23. "V" shaped supports 26 each have a hub 60 formed at the apex of the V, hub 60 provided with an axle hole 59 disposed laterally therethrough for receipt of axle 25 therein. "V" shaped supports 26 may be welded to top plate 33 of roller support member 23 and to cross member 22 though it has been found that shipping of device 10 is simplified by providing removable fasteners 35 for affixing "V" shaped supports 26. Axle 25 is preferably a ⅝ inch diameter steel rod passed through axle holes 59 in hubs 60 and extending therefrom for mounting of wheels 15 thereupon. Wheels 15 are preferably Haul-Master 4.10×3.50×4 inch pneumatic tire/hub assemblies readily available at hardware, tool supply and lumber stores. Roller assemblies 31 comprise a "U" shaped bracket 29 provided with a spindle 28, spindle 28 carrying a 3" cast iron/rubber caster roller 14 thereupon. Roller assemblies 31 are also readily available at hardware, tool supply and lumber stores. Thus, all materials for device 10 are common materials and therefore, device 10 may be economically manufactured.

Main frame 11 preferably has an extension frame 39 comprising side members 41, top bar 40 and handle 18, side members 41 being separable extensions of upright members 21. Extension frame 39 is provided primarily for shipping purposes as device 10 may be separated into shorter parts for ease and cost effectiveness of shipping. As readily observed in FIG. 1, extension frame 39 is part and parcel of main frame 11, side members 41 of extension frame 39 joined at break 37 with a joint plate 38 to complete upright members 21 of main frame 11. Joint plate 38 spans across break 37 on an inside surface 44 of upright members 21 wherein joint plate 38 is fastened to both side members 41 and upright members 21 with fasteners 35 which are removable for removal of extension frame 39. Preferably, top bar 40 and handle 18 are firmly affixed to side members 41 by means known in the art. Most preferably, top bar 40 is welded to an inside surface 42 at end 43 of side members 41 and handle 18 is welded to a back side surface of side members 41 at a distance above support surface 62 for ease of grasping, tilting and transporting device 10 over support surface 62. Though it is preferred that side plates 38 are 2 inch by 3/16 inch thick steel plates that are removable from side members 41, side plates 38 may be welded to inside surface 44 of side members 41. Side members 41 are preferably 2 inch by 2 inch by ⅛ inch thick angle iron while top bar 40 is preferably 1½ inch by 1½ inch by ⅛ inch angle iron and handle 18 is a one inch square, 14 gauge wall box beam, however, side members 41 may alternately be round tubing, box beam or any other shape as long as side members 41 effectively mate with upright members 21 of main frame 11.

Likewise, top bar 40 may be round tubing, box beam or any other shape and handle 18 may be round tubing, angle iron or any other shape. Additionally, though iron has been recited for upright members 21, side members 41, top bar 40, roller support bar 23 and cross members 22 it should be fully understood that main frame 11 and/or extension frame 39 may be constructed of other materials without departing from the scope of this invention. Additionally, it is fully within the scope of this invention to utilize material thicknesses other than those specified herein as preferred thicknesses.

Movable carriage 12 comprises a pair of longitudinal side rails 46, at least one cross rail 49, a top rail 47, a bottom rail 48 and a plurality of guide rails 50, longitudinal rails 46 joined together by cross rails 49, top rail 47 and bottom rail 48. Guide rails 50 are mounted to an outside edge 55 of longitudinal rails 46 and adapted to slidably engage spaced apart upright members 21 of said main frame 11 and side members 41 of extension frame 39 along an frontal surface 67 of upright members 21 and behind a backside surface 68 thereof. Winch 24 is mounted to one cross member 22 of main frame 11, preferably upon a plate 36 with fasteners 35 extending through base holes 45 in winch 24 and fastener holes 32 in plate 36. Pulley assembly 13 is rotatably mounted on a top bar 40, cable 17 extending from winch 24, through pulley assembly 13 and is affixed to bottom rail 48 of movable carriage 12 with a fastener 35 passing through bottom rail 48. Winch 24 is preferably a DLB350A Brake winch manufactured by and available from Dutton-Lainson Co., 451 W. 2nd Street Hastings, Nebr. 68901. Winch 24 allows for raising and lowering movable carriage 12 without releasing of a pawl on a ratchet assembly and thus it is much easier to lift and position panel 63 upon vertical surface 64. Cable 17 is readily available as it is preferably a ⅛ inch twisted steel cable terminated at bottom rail 48 with a cable end clevis 52 which is centrally fastened to bottom rail 48 with a fastener 51 with the opposite end wound around a drum on winch 24.

Longitudinal side rails 46 and top rail 47 of movable carriage 12 are preferably ¾ inch to 1 inch square steel tubing welded together at right angles thereto at top ends 57 of longitudinal side rails 46 though other means of fastening these components together is fully within the scope of this invention. Cross rails 49 of movable carriage 12 are preferably ¾ inch square steel tubing, centrally located on and welded to inside edge 54 of longitudinal side rails 46. Cross rails 49 are located approximately half the distance from top rail 47 to bottom rail 48 but may be located at any position as desired. Cross rails 49 are also preferably held in spaced apart relationship with a brace plate 53 welded therebetween. Brace plate 53 preferably is provided with required warning labels and instructions for proper use of device 10. Though cross rails 49 may be omitted, cross rails 49 provide rigidity to movable carriage 12 to allow movable carriage 12 to be raised from bottom rail 48 without deformation of movable carriage 12 carrying construction panel 63. Bottom rail 48 is preferably 1×1×⅛ inch angle and may be welded to inside edges 54 at bottom end 58 of longitudinal rails 46, but preferably is welded to front surface 70 at bottom end 58 of longitudinal rails 46 such that lip 19 of bottom rail 48 extends forward of longitudinal rails 46. As lip 19 extends forward of longitudinal rails 46, construction panel 63 is easily rested upon and carried by lip 19 during transport, lift and positioning. Guide rails 50 are affixed to outside edges 55 of longitudinal rails 46 and are preferably 1 inch steel angle irons and are preferably welded to outside edges 55. Guide rails 50 are arranged on outside edges 55 of longitudinal rails 46 such that an open side 56 of each guide rail 50 extends behind a backside surface 61 and inwardly toward inside edges 54 of longitudinal rails 46 a sufficient distance to allow movable carriage 12 to freely move upon frontal surface 67 while retained around edge 69 of upright members 21, 41. Though guide rails 50 are shown as continuous alongside outside edges 55 of longitudinal rails 46, guide rails 50 may be affixed to outside edges 55 in short sections to fully accomplish the intended purpose described above. Guide rails 50 and/or backside surfaces 61 of longitudinal rails 46 may be provided with friction reducing materials to promote a low friction sliding engagement of movable carriage 12.

Figure 2:
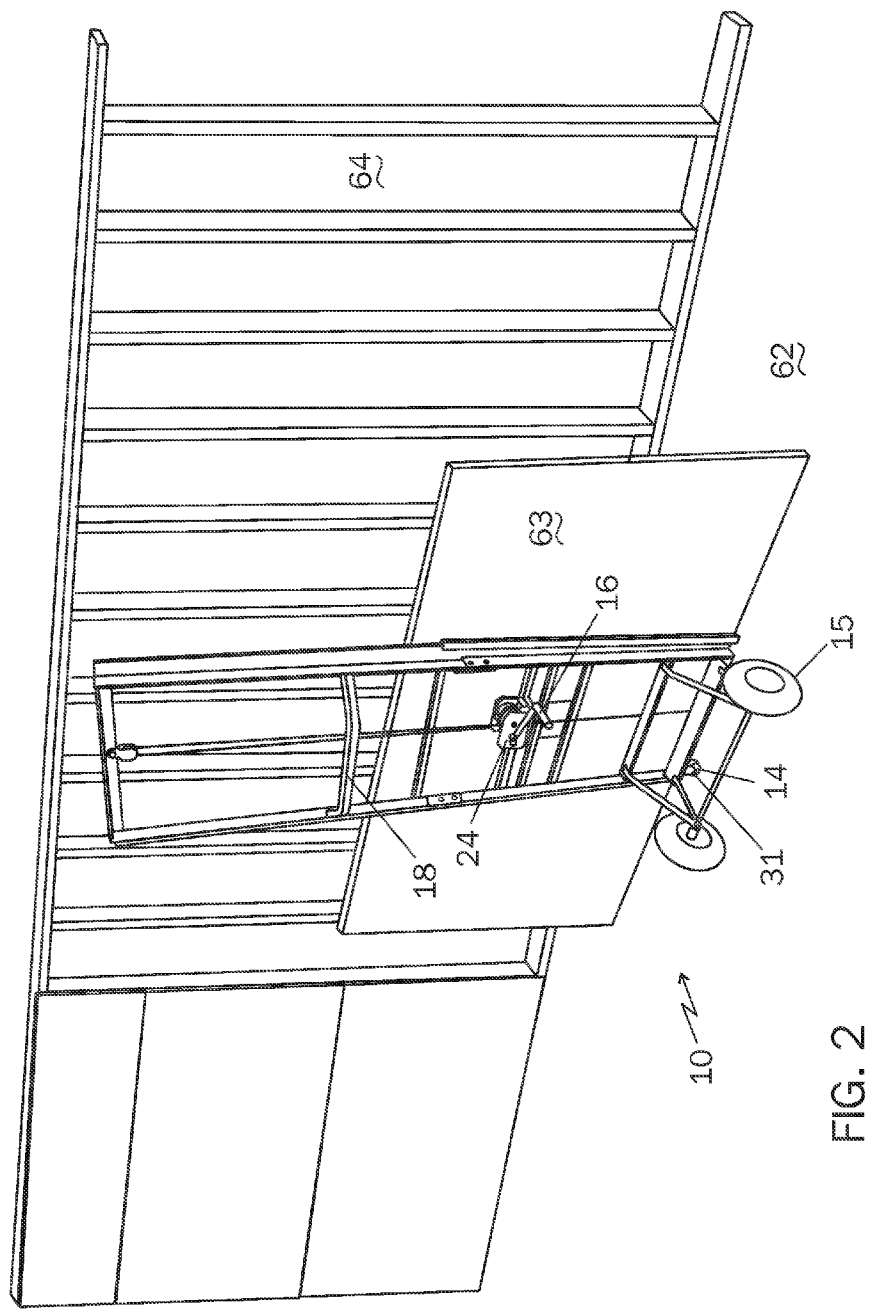
FIG. 2 is a perspective view of the preferred embodiment of the panel transport, lift and positioning device of FIG. 1 shown ready for transport of a panel.
Figure 3:
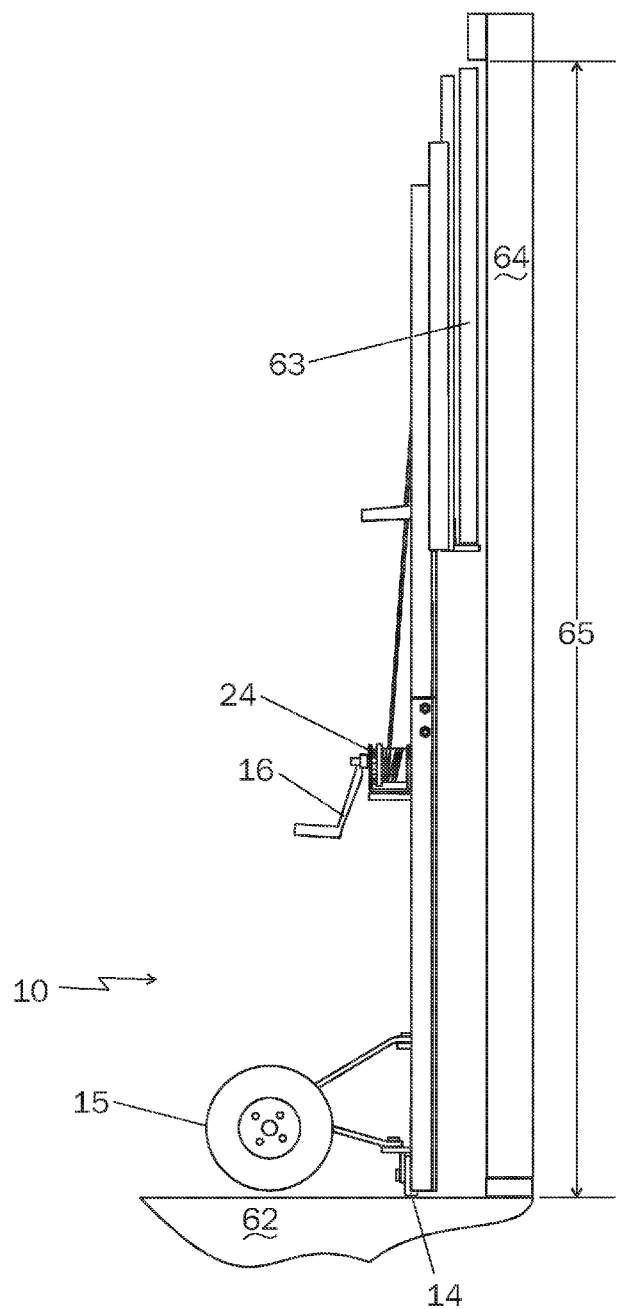
FIG. 3 is a perspective view of the panel transport, lift and positioning device of FIG. 1 shown balanced against a vertical surface with a panel in an elevated position.

Jointly considering FIGS. 1-3, when in use, device 10 is first adapted to receive panel 63, such as OSB, sheet rock, sheet insulation, plywood or the like upon lip 19 of movable carriage 12 by an operator of device 10. It has been found by the inventor hereof that construction panels 63 are generally stacked on edge on a support surface 62 and therefore it is a simple matter to place device 10 approximately centrally alongside the panel stack with nose 66 of lip 19 adjacent the panel stack, and as device 10 is adapted to be supported on both wheels 15 and rollers 14 thus essentially stopped in position, the operator may then lift one end of panel 63 and place the central portion of panel 63 on lip 19. The opposing end of panel 63 may also be lifted to locate panel 63 on lip 19, however, as device 10 leans rearwardly as clearly shown in FIG. 2, it has also been found by the inventor hereof that panel 63 will readily rest upon lip 19 by lifting one end and placing panel 63 on lip 19 and leaning panel 63 against moveable carriage 12 thus placing a center of gravity of the combination of device 10 and panel 63 essentially over axle 25. Thereafter, the operator grasps handle 18 of main frame 11 and tips device 10 at a greater angle thus lifting rollers 14 clear of support surface 62. Since device 10 is no longer fixed in position as rollers 14 have been lifted clear of support surface 62, device 10 may be moved on wheels 15 along support surface 62 to a location alongside a vertical surface 64 which is to receive the construction panel 63 thereupon. Nose 66 of lip 19 is then placed adjacent vertical surface 64 and device 10 is leaned toward vertical surface 64 until a center of gravity of panel 63 and device 10 is forward of rollers 14. As device 10 is tilted toward vertical surface 64, wheels 15 are lifted free of support surface 62 and device 10 is supported only on rollers 14 and against vertical surface 64 as clearly shown in FIG. 3. Device 10 may then be moved laterally along support surface 62 to place panel 63 in the proper position for fastening to vertical surface 64. If panel 63 is to be fastened to vertical surface 64 proximate support surface 62, panel 63 is moved free of lip 19 and fasteners are used to affix panel 63 to vertical surface 64.

Referring to FIGS. 1 and 2, device 10 is also adapted to receive construction panel 63 upon protruding lip 19 thereof with device 10 resting on support surface 62 on wheels 15 and rollers 14 for the purpose of transporting panel 63 to another location. While loading construction panel 63 thereupon, device 10 is substantially fixed in position as wheels 15 and rollers 14 are mounted on axle 25 and spindles 28, respectively, at right angles, and therefore, since device 10 cannot roll in two directions simultaneously, device 10 will not move while construction panel 63 is lifted on one end and having a central portion thereof rested on lip 19. Thereafter, device 10 is ready for transporting panel 63 to another location such as a position adjacent vertical surface 64 shown spaced from panel 63 in FIG. 2. In order to transport panel 63 over support surface 62 upon device 10, rollers 14 are disengaged from support surface 62 by tilting device 10 rearwardly by grasping handle 18 and rotating device 10 to a transport attitude. Device 10 may then be used to transport panel 63 along support surface 62 with panel 63 supported on lip 19 of movable carriage 12 by rolling device 10 with panel 63 thereupon across support surface 62 wheels 15 of device 10 to a position adjacent vertical surface 64 or to another storage location.

Upon arrival at another storage location or adjacent vertical surface 64, device 10 then has rollers 14 re-engaged with support surface 62 by slowly raising handle 18 allowing device 10 to rotate upon axle 25 until rollers 14 again engage support surface 62. Thereafter, construction panel 63 may be removed from lip 19 in a manner opposite that of placing panel 63 upon lip 19. Preferably, however, device 10 is adapted to be fully supported on support surface 62 on rollers 14 by raising handle 18 further for leaning device 10 against vertical surface 64 or against additional panels 63 already placed in the alternate storage location. Upon leaning device 10 into a stack at the alternate storage location or against vertical surface 64 as best shown in FIG. 3, wheels 15 become fully disengaged from support surface 62 and a center of gravity of device 10 shifts forward of rollers 14 thus retaining panel 63 on lip 19 along with device 10 against the stack or vertical surface 64.

Still referring to FIG. 2 but also to FIG. 3, device 10 is additionally adapted for positioning panel 63 as device 10 is adapted to move laterally upon rollers 14 while leaned against a stack or vertical surface 64 whereupon panel 63 is moved along vertical surface 64 upon rollers 14, as rollers 14 only are engaged with support surface 62. By moving panel 63 along vertical surface 64, panel 63 may be placed adjacent a previously erected structure such as a corner of a building, on top of and/or against another panel 63 already positioned on vertical surface 64. Once panel 63 is placed in position, one end of panel 63 may be fastened to vertical surface 64 while the remainder of panel 63 rests on lip 19. Upon fastening a portion of panel 63 to vertical surface 64, panel 63 may then be removed from lip 19 and the remainder of panel 63 affixed to vertical surface 64. Alternately, nose 66 of lip 19 may be placed against vertical surface 64 or panels 63 already erected on vertical surface 64, panel 63 laterally positioned as recited above whereupon panel 63 is removed from lip 19 and rested on support surface 62 or on an edge of another panel 63 already placed on vertical surface 64. As device 10 has a center of gravity forward of rollers 14 when leaned against vertical surface 64, panel 63 will be biased against vertical surface 64 by device 10.

Now referring specifically to FIG. 3, panel 63 on device 10 is shown in an elevated position above and spaced from other panels 63 already fixed to vertical surface 64 and thus device 10 is also adapted to elevate panel 63 to a position above support surface 62. When it is desired to elevate panel 63 to a position above support surface 62, for instance to a position on top of panel 63 already affixed to vertical surface 64 as shown in FIG. 3, while device 10 and panel 63 lean against vertical surface 64, hand crank 16 of winch 24 is used to lift movable carriage 12 with panel 63 upon lip 19. As cable 17 is rove from winch 24 through pulley assembly 13 and anchored on bottom rail 48 of movable carriage 12, movable carriage 12 is lifted along upright members 21 and vertical surface 64 by operating winch 24 with hand crank 16 and without device 10 moving away from vertical surface 64 since wheels 15 are not in contact with support surface 62. When raised to the elevated position, device 10 with panel 63 upon lip 19 may be moved laterally along vertical surface 64 to properly place panel 63 on top of panel 63 already affixed to vertical surface 64 and adjacent another panel 63 also already affixed to vertical surface 64. Since wheels 15 are raised free of support surface 62, device 10 and panel 63 thereupon are supported only on rollers 14 and device 10 will remain biased against vertical surface 64 until moved by an operator thereof. As recited above, once panel 63 is placed in position, one end of panel 63 may be fastened to vertical surface 64 while the remainder of panel 63 rests on lip 19 and thereafter panel 63 may be removed from lip 19 and the remainder of panel 63 affixed to vertical surface 64. Alternately, nose 66 of lip 19 may be placed against panels 63 already erected on vertical surface 64, panel 63 on device 10 laterally positioned as recited above whereupon panel 63 is removed from lip 19 and rested on an edge of another panel 63 already placed on vertical surface 64.

When preparing for shipping, wheels 25 are removed from axle 25 by removal of a keeper pin passed through a hole in axle 25 outboard of wheels 25 as is conventional in the art. Axle 25 is then removed from "V" shaped supports 26 and "V" shaped supports 26 are removed from roller support member 23 and cross member 22 by removing fasteners 25 attaching "V" shaped supports 26 thereto. Wheels 15, axle 25 and "V" shaped supports 26 are then separately boxed along with winch 24 and placed between upright members 21. Extension frame 39 is removed from main frame 11 by removing fasteners 35 passed through joint plate 38 and upright members 21. Movable carriage 12 is installed on side rails 41 of extension frame 39, this assemblage inverted and placed under main frame 11 with side rails 41 lying alongside upright members 21. Since wheels 15, winch 24 with handle 16 removed therefrom and main frame 11 lying on top of movable carriage 12 slid onto extension frame 39 are effectively all only about six inches in height when lying on a base of a shipping carton, shipping of panel device 10 may be accomplished in a shipping carton approximately 30 inches in width, six inches deep and approximately 44 inches in length.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A device for transporting a panel to a position adjacent a vertical surface comprises a pair of spaced apart upright members, two wheels, two rollers, a pulley assembly, a winch, a cable, a movable carriage, and a plurality of cross members, said spaced apart upright members joined together by said cross members, said wheels rotatably mounted on an axle supported on a pair of "V" shaped supports affixed adjacent a lower end of said upright members, said rollers spaced apart and rotatably mounted on separate spindles arranged perpendicular to said axle, said spindles carried in brackets affixed to an underside surface of a lower one of said cross members, said movable carriage comprising a pair of longitudinal rails, a plurality of cross rails and a pair of guides, said longitudinal rails joined together by said plurality of cross rails, said pair of guides separately mounted to outside edges of said longitudinal rails, said winch mounted to an interior one of said cross members, said pulley assembly rotatably mounted on an upper one of said cross members, said cable extending from said winch, through said pulley assembly and affixed to an eye on a lower cross rail of said movable carriage wherein said guides each extend along a major portion of said longitudinal rails, behind a backside surface of and inwardly toward an inside edge of said upright members whereupon said movable carriage is adapted to slidably move along a frontal surface of said spaced apart upright members with said guides retaining said movable carriage upon said upright members.

2. A device for transporting a panel as described in claim 1 wherein said movable carriage is adapted to receive a construction panel upon a protruding lip thereof, said device resting on a surface upon said wheels and said rollers.

3. A device for transporting a panel as described in claim 2 wherein said rollers are disengaged from said surface upon tilting said device to a transport attitude, said panel supported on said movable carriage and transported on said wheels of said device to said position adjacent said vertical surface.

4. A device for transporting a panel as described in claim 3 wherein said device is supported on said surface on said rollers upon leaning said device against said vertical surface wherein said wheels are disengaged from said surface and wherein a center of gravity of said device shifts forward of said rollers to retain said panel and said device against said vertical surface.

5. A device for transporting a panel as described in claim 4 wherein said device is adapted to move laterally upon said rollers moving said panel along said vertical surface to place said panel adjacent a previously erected structure.

6. A device for transporting a panel as described in claim 5 wherein said previously erected structure is another said panel.

7. A device for transporting and positioning a panel upon a wall comprises a pair of spaced apart upright members, a pair of wheels, a pair of rollers, a pulley assembly, a winch, a cable, a movable carriage, and a plurality of cross members, said spaced apart upright members joined together by said cross members, said pair of wheels rotatably mounted on an axle supported on a pair of "V" shaped supports affixed adjacent a lower end of said upright members, said pair of rollers spaced apart and rotatably mounted perpendicular to said axle on spindles affixed to an underside surface of a lower one of said cross members, said movable carriage comprising a pair of longitudinal rails, a plurality of cross rails and a plurality of guides, said longitudinal rails joined together by said plurality of cross rails and said plurality of guides mounted to an outside edge of said longitudinal rails and adapted to slidably engage said movable carriage along a frontal surface of said spaced apart upright members, said winch mounted to an interior one of said cross members of said main frame, said pulley assembly rotatably mounted on an upper one of said cross members, said cable extending from said winch, through said pulley assembly and affixed to an eye on a lower cross rail of said movable carriage wherein said guides wrap around a side edge and open sides of said guides extend behind a backside surface of said spaced apart upright members of said main frame whereupon said movable carriage is adapted to slidably move along said frontal surface of said spaced apart upright members, said guides retaining said movable carriage upon said spaced apart upright members.

8. A device for transporting and positioning a panel as described in claim 7 wherein said device is adapted to rest upon a surface upon said wheels and said rollers wherein said movable carriage is adapted to receive a construction panel upon a protruding lip thereof.

9. A device for transporting a panel as described in claim 8 wherein said rollers are disengaged from said surface upon tilting said device with a handle affixed to a backside surface of said upright members, said handle extending rearwardly of said upright members.

10. A device for transporting, lifting and positioning a panel upon a wall comprises a pair of spaced apart upright members, a plurality of wheels, a plurality of rollers, a pulley assembly, a winch, a cable, a movable carriage, and at least two cross members, said spaced apart upright members joined together by said cross members, said wheels rotatably mounted on an axle supported on a pair of "V" shaped supports affixed adjacent a lower end of said upright members, said rollers spaced apart and rotatably mounted perpendicular to said axle on spindles affixed to an underside surface of a lower one of said cross members, said movable carriage comprising a pair of longitudinal rails, a plurality of cross rails and at least two guides, said longitudinal rails joined together by said plurality of cross rails, said guides mounted to an outside edge of said longitudinal rails and adapted to retain said movable carriage adjacent a frontal surface of said upright members of said main frame, said movable carriage slidably engaged along said frontal surface of said spaced apart upright members, said guides extending around an edge and behind a backside surface of said spaced apart upright members of said main frame, said winch mounted to an interior one of said cross members of said main frame, said pulley assembly rotatably mounted on an upper one of said cross members, said cable extending from said winch, through said pulley assembly and affixed to an eye on a lower cross rail of said movable carriage.

\* \* \* \* \*